J. W. MAY.
INCUBATOR.
APPLICATION FILED MAY 17, 1912.
1,150,379.
Patented Aug. 17, 1915.
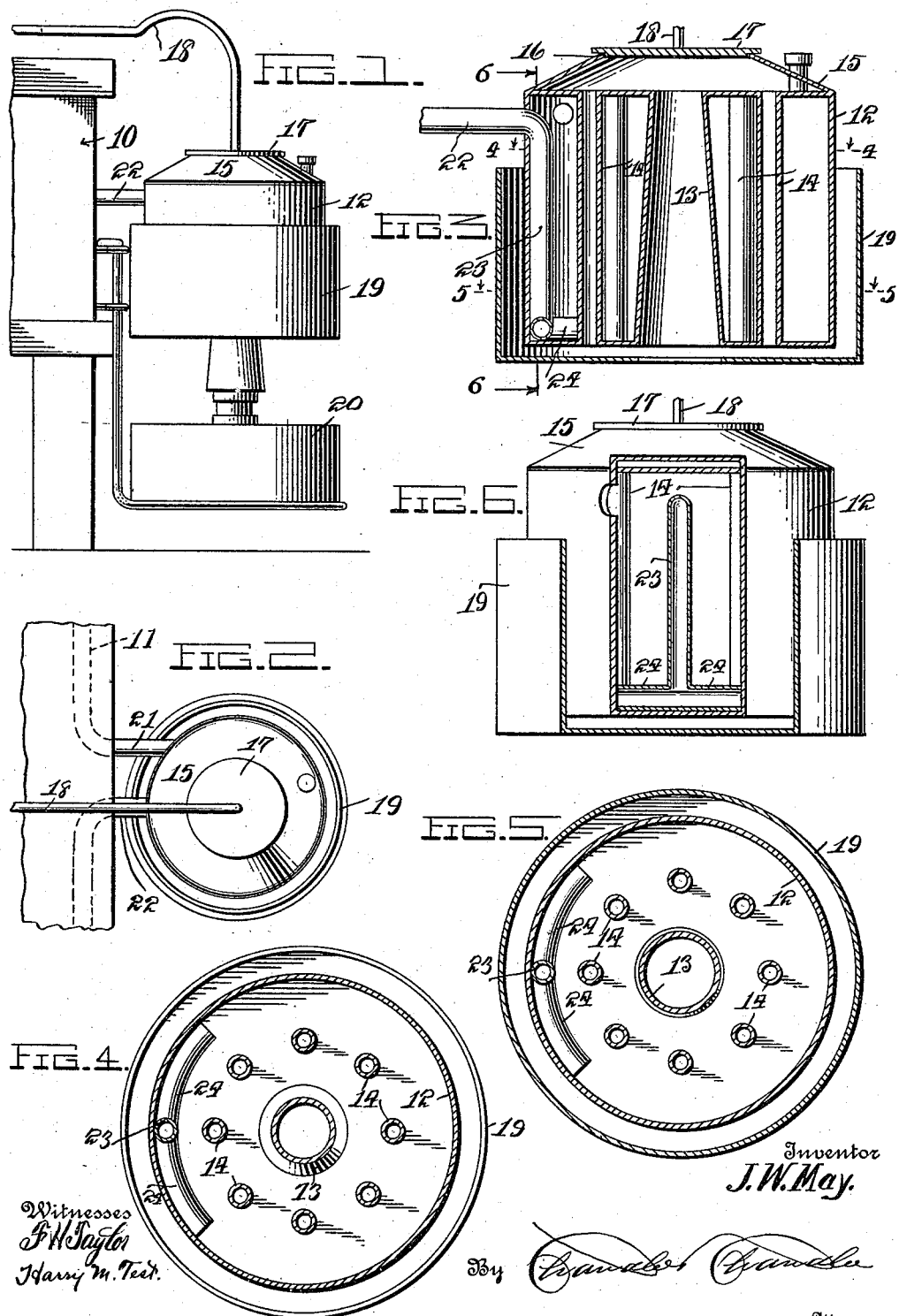
Witnesses
J. W. Taylor
Harry M. Test
Inventor
J. W. May.
By Chandler & Chandler
Attorneys

UNITED STATES PATENT OFFICE.

JAMES W. MAY, OF HURON, SOUTH DAKOTA.

INCUBATOR.

1,150,379.   Specification of Letters Patent.   Patented Aug. 17, 1915.

Application filed May 17, 1912. Serial No. 697,965.

*To all whom it may concern:*

Be it known that I, JAMES W. MAY, a citizen of the United States, residing at Huron, in the county of Beadle, State of South Dakota, have invented certain new and useful Improvements in Incubators; and I do hereby declare the following to be a full, clear, and exact description of the invention, such as will enable others skilled in the art to which it appertains to make and use the same.

This invention relates to improvements in incubators, and has particular reference to a water heating system therefor.

The principal object of the invention is to provide an improved heater whereby the heat is caused to pass over the greatest amount of surface before thoroughly heating the water.

Other objects and advantages will be apparent from the following description and with particular reference to the accompanying drawings.

In the drawings: Figure 1 is a side elevation of my device showing a portion of the incubator, Fig. 2 is a top plan view, Fig. 3 is a vertical longitudinal sectional view through the heating device, Fig. 4 is a horizontal sectional view on the line 4—4 of Fig. 3, Fig. 5 is a horizontal sectional view on the line 5—5 of Fig. 3, and Fig. 6 is a vertical transverse sectional view on the line 6—6 of Fig. 3.

Referring particularly to the drawings, 10 represents the incubator, in which is located the water circulating pipe 11. Mounted on a bracket at one end of the incubator is a water tank 12. Extending vertically through the tank is a central flue 13 and a circular series of vertical flues 14. A dome 15 is disposed over the top of the tank, and is provided with a central vent opening 16 covered by the damper plate or valve 17, mounted on the usual pivoted arm 18. The tank 12 is completely closed, the flues extending through the tank, being open at both ends, the upper ends of said flues opening into the dome 15. The tank is mounted in a receptacle 19 which has an open top, as clearly shown. The central flue 13 is placed over the chimney of the heating lamp 20, the heat passing through the central flue, laterally in the dome and down through the flues 14, from whence it passes upwardly between the outer walls of the tank, and the surrounding wall of the receptacle 19. In this way the heat traverses the tank 12 three times, once in ascending through the central flue, then down through the circular series of flues, and then up between the tank and the receptacle. This will thoroughly heat the water in the tank, and retain the heat. Connected to the upper part of the tank, and to the circulating pipe 11 is an inlet pipe 21 which conveys the heated water into the circulating pipe. A return outlet pipe 22 also connects with the circulating pipe 11, and extends into the tank 12, near the top, makes a drop as indicated at 23, and is provided on its lower end, which is disposed in the bottom of the tank with the branches 24 so that the returned cool water will be more evenly distributed, and more quickly heated, so that it can again rise to the top of the tank and pass out through the pipe 21.

What is claimed is:

A water heater for disposition on the heating lamp of an incubator, comprising an open-topped receptacle, a water tank disposed in the receptacle and spaced from the sides and bottom of the receptacle, a vented dome on the top of the tank and forming a part of the tank, a valve for closing the vent, a vertical central hot air flue extending through the tank and discharging into the dome, said flue adapted to receive the flue of the lamp, a circular series of vertical flues extending through the tank and communicating with the said dome, whereby the hot air from the central flue will pass up into the dome and be deflected down through the series of flues against the bottom of the receptacle and upwardly between the tank and receptacle.

In testimony whereof, I affix my signature, in presence of two witnesses.

JAMES W. MAY.

Witnesses:
R. B. HILL,
EDWIN H. VANCE.

Copies of this patent may be obtained for five cents each, by addressing the "Commissioner of Patents, Washington, D. C."